United States Patent
Ono et al.

(10) Patent No.: US 9,245,210 B2
(45) Date of Patent: Jan. 26, 2016

(54) INK JET HEAD AND INK JET PRINTING APPARATUS HAVING THE SAME

(71) Applicants: KABUSHIKI KAISHA TOSHIBA, Tokyo (JP); TOSHIBA TEC KABUSHIKI KAISHA, Tokyo (JP)

(72) Inventors: Shunichi Ono, Izu Shizuoka (JP); Noboru Nitta, Kinnami Shizuoka (JP); Teruyuki Hiyoshi, Izunokuni Shizuoka (JP); Tomohisa Yoshimaru, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/554,743

(22) Filed: Nov. 26, 2014

(65) Prior Publication Data

US 2015/0151536 A1 Jun. 4, 2015

(30) Foreign Application Priority Data

Nov. 26, 2013 (JP) ................................. 2013-243797

(51) Int. Cl.
*B41J 29/38* (2006.01)
*G06K 15/10* (2006.01)
*B41J 2/045* (2006.01)

(52) U.S. Cl.
CPC ............. *G06K 15/10* (2013.01); *B41J 2/04541* (2013.01); *B41J 2/04573* (2013.01); *B41J 2/04586* (2013.01)

(58) Field of Classification Search
CPC .. B41J 2/0458; B41J 2/04586; B41J 2/04573; B41J 2/04541; B41J 2/04521; G06K 15/10; G06K 15/1894
USPC .................. 347/9–11; 358/1.1, 1.16, 1.18, 1.9
See application file for complete search history.

(56) References Cited

U.S. PATENT DOCUMENTS 6,493,109 B1  12/2002  Takamura et al.
6,943,911 B1   9/2005  Ono et al.

FOREIGN PATENT DOCUMENTS

JP    2001-030577 A    2/2001

*Primary Examiner* — An Do
(74) *Attorney, Agent, or Firm* — Patterson & Sheridan, LLP (57) ABSTRACT

An ink jet head includes an actuator configured to cause ejection of ink, and a driver. The driver is configured to receive serial data including a first command, a second command subsequent thereto, and print data for printing or setting data for setting of the ink jet head that is subsequent to the second command, detect the first command in the serial data, decode the second command, and control the actuator based on the decoded second command.

17 Claims, 7 Drawing Sheets

INK JET HEAD AND INK JET PRINTING APPARATUS HAVING THE SAME

CROSS-REFERENCE TO RELATED APPLICATION

This application is based upon and claims the benefit of priority from Japanese Patent Application No. 2013-243797, filed Nov. 26, 2013, the entire contents of which are incorporated herein by reference.

FIELD

Embodiments described herein relate generally to an ink jet head and an ink jet printing apparatus having the ink jet head.

BACKGROUND

In general, an ink jet head of an ink jet printer has a driver IC for driving the ink jet head. Print data is usually transferred to the driver IC as serial data. As a method of data transfer, transfer of packet data, including a start bit and data to be transferred subsequent thereto is employed. The start bit is detected by the driver IC, and when the start bit is detected, transfer of the data subsequent to the start bit is performed. Such a start bit signals transfer of both print data and setting data of the driver IC for changing a drive control condition.

DETAILED DESCRIPTION

In the related art described above, when a noise, such as discharged static electricity, is input to a data line, a driver IC may erroneously detects the noise as a start bit, and an erroneous data transfer may be performed. In addition, the start bit only functions as a trigger to start the data transfer, and a setting operation for changing a drive waveform during a print data transfer cannot be triggered by the start bit. The setting operation has to be performed after completion of the print data transfer.

Embodiments is directed to provide an ink jet head and an inkjet printing apparatus having the inkjet head that can prevent a misdetection of a noise as the start bit and execute a setting operation even during the print data transfer.

In general, according to one embodiment, an ink jet head includes an actuator configured to cause ejection of ink, and a driver. The driver is configured to receive serial data including a first command, a second command subsequent thereto, and print data for printing or setting data for setting of the ink jet head that is subsequent to the second command, detect the first command in the serial data, decode the second command, and control the actuator based on the decoded second command.

Hereinafter, exemplary embodiments will be described in detail with referring to the drawings.

Figure 1:
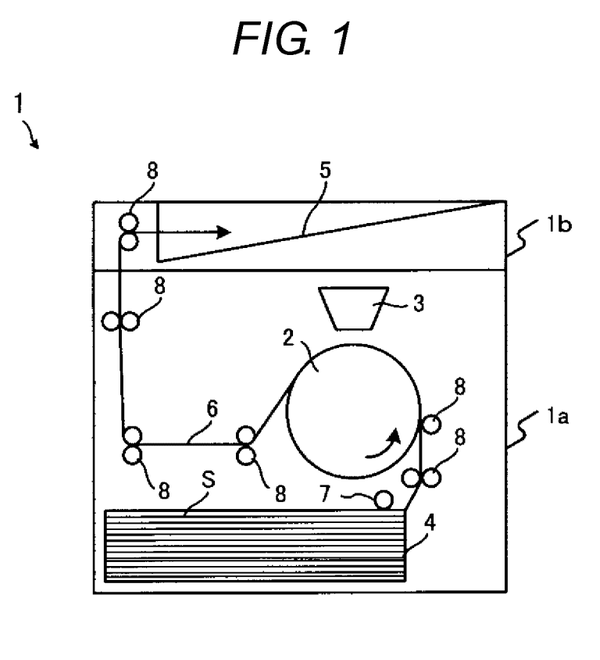
FIG. 1 illustrates an ink jet printer according to an embodiment.

FIG. 1 schematically illustrates an ink jet printer 1 according to an exemplary embodiment. The ink jet printer 1 includes a housing that is formed of a main body 1a and a cover 1b, which is provided on the main body 1a in an openable and closable manner. A drum 2 is disposed substantially at the center of the housing in a rotatable manner in an arrow direction in FIG. 1. A plurality of ink chambers (not illustrated) is disposed in the ink jet head 3, and ink discharge ports of these ink chambers are disposed to face the drum 2.

A sheet feeding cassette 4, in which sheets S are stored, is provided at a lower portion of the housing, and a sheet discharge slit 5 from which a printed sheet is discharged is provided at an upper portion of the housing. A pick-up roller 7 that picks up the sheets S in the sheet feeding cassette 4 one by one and introduces the picked-up sheet to a transport route 6 is formed in the vicinity of the sheet feeding cassette 4. In addition, a transport roller 8 that transports the sheet from the sheet feeding cassette 4 is provided along the transport route 6. When the ink jet printer 1 performs printing, each of the sheets S from the sheet feeding cassette 4 is wound around the drum 2, the drum 2 rotates for each sheet S, the ink jet head 3 performs an ink discharge, and the sheet S is transported along the transport route 6 and discharged through the sheet discharge slit 5.

Figure 2:
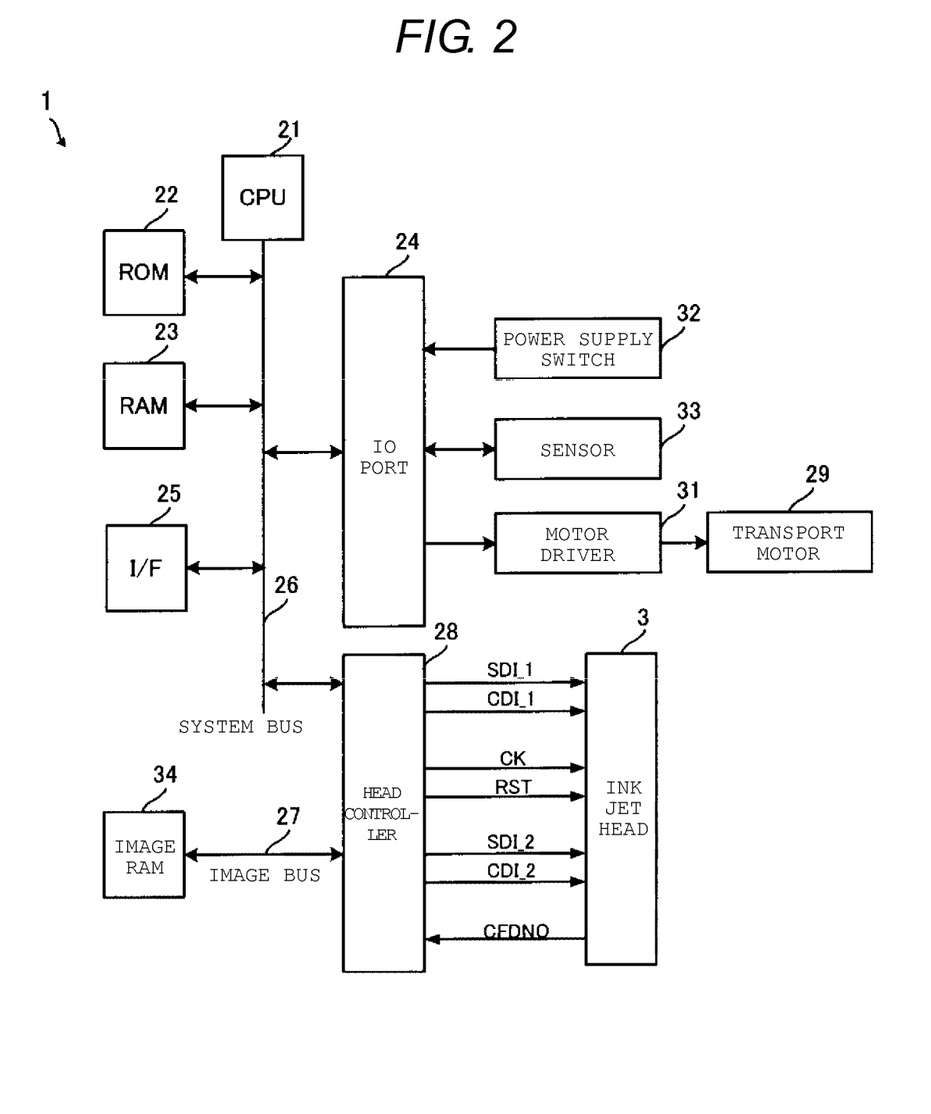
FIG. 2 is a block diagram of a hardware configuration of the ink jet printer.

FIG. 2 is a block diagram of a hardware configuration of the ink jet printer 1 illustrated in FIG. 1. The ink jet printer 1 includes a central processing unit (CPU) 21, which is a main component of a control system, a read only memory (ROM) 22 in which program data that the CPU 21 uses to control each component is stored, a random access memory (RAM) 23, which is a memory area used for various data processes performed by the CPU 21, an I/O (input and output) port 24, and an interface (I/F) 25 to which a host computer (not illustrated) is connected through a communication cable. The ROM 22, the RAM 23, the I/O port 24, and the I/F 25 are electrically connected to the CPU 21 through a system bus 26.

The RAM 23 stores each value of elapsed time (minutes) counted by a timer counter, the number (sheets) of printed sheets counted by a printed sheet counter, and the number (sheets) of continuously-printed sheets counted by a continuously-printed sheet counter.

A motor driver 31, a power supply switch 32, and a sensor 33 are connected to the I/O port 24, respectively. The head controller 28 and the ink jet head 3 are connected through a data line RST for a reset signal that causes image data buffer (not illustrated) to be cleared by a driver IC of the ink jet head 3 and a data line CFDNO for a setting status signal that is output from the ink jet head 3, in addition to a print data line SDI and a setting data line CDI through which a serial transfer is performed. The head controller 28 outputs a control signal to the ink jet head 3 through each of the data lines, and controls the ink jet head 3. The motor driver 31 controls a transport motor 29 that drives the drum 2, the pick-up roller 7, and the transport roller 8. The sensor 33 is a chuck sensor which detects that a sheet is properly wound around the drum 2, a cover sensor that detects opening of the cover, or the like.

Image data transmitted from the host computer (not illustrated) for printing passes through the head controller 28 and is temporarily buffered in an image RAM 34. The head controller 28 reads the image data from the image RAM 34, one line at a time in accordance with a drive timing of the ink jet head 3, performs data conversion including parallel and serial conversions, and performs a synchronous control. According to the embodiment, one line of the image data is split into three split lines, and is transferred, in serial, to the driver IC that is equipped in the ink jet head 3 through the data line SDI.

Figure 3:
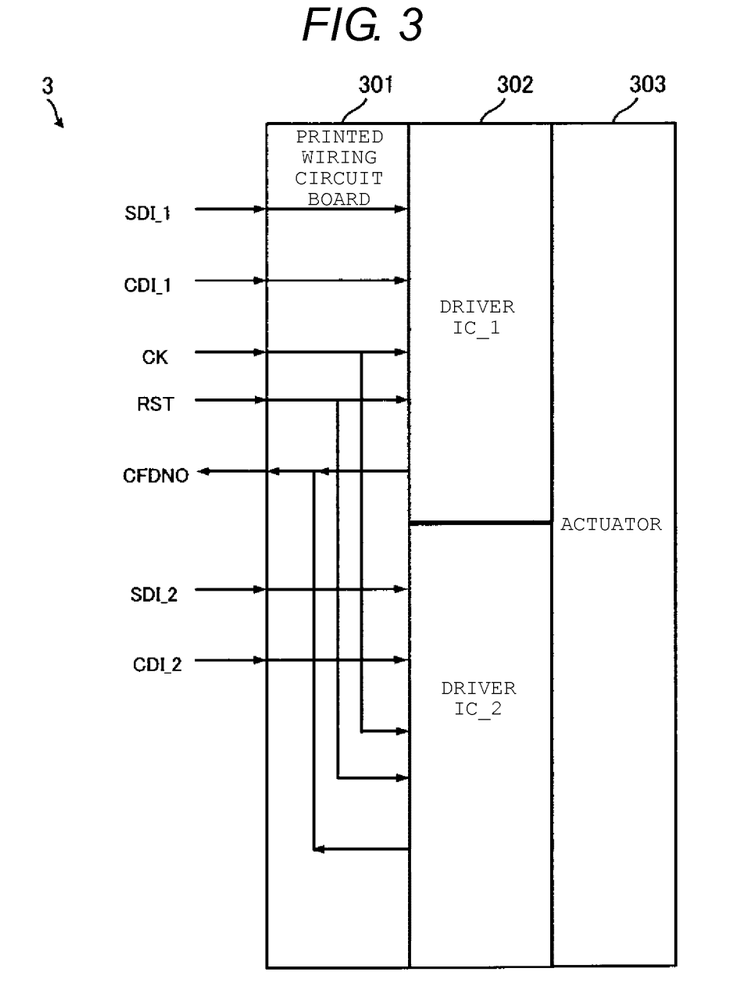
FIG. 3 is a block diagram of an ink jet head of the ink jet printer.

FIG. 3 is a block diagram of the ink jet head 1 illustrated in FIG. 2. As illustrated in FIG. 3, the ink jet head 3 is configured to have a printed wiring circuit board 301, driver ICs 302, and an actuator 303. Two driver ICs 302 (IC_1 and IC_2) are connected to a single actuator 303 in parallel, and the print data line SDI and the setting data line CDI, through which the serial transfer is performed, are individually connected to each driver IC 302. Here, the print data line SDI and the setting data line CDI are connected to each driver IC 302 for the shorter transfer time.

Figure 4:
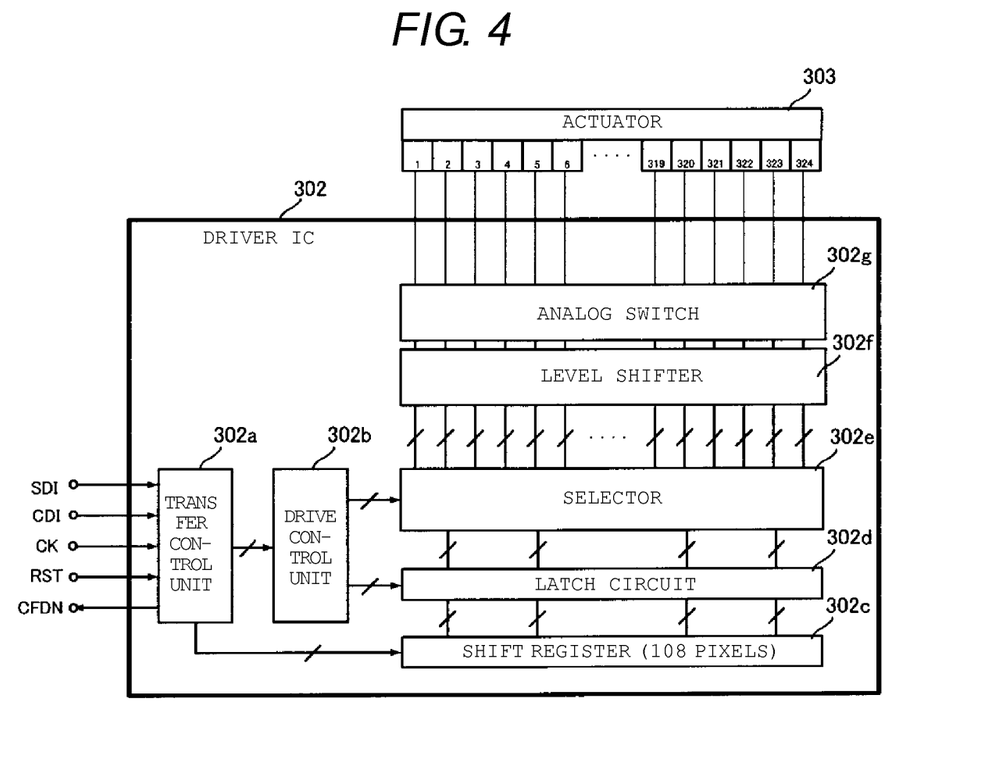
FIG. 4 is a block diagram of a driver IC of the ink jet head.

FIG. 4 is a block diagram of the driver IC 302 illustrated in FIG. 3. As illustrated in FIG. 4, the driver IC 302 has a transfer control unit 302a, a drive control unit 302b, a shift register 302c, a latch circuit 302d, a selector 302e, a level shifter 302f, and an analog switch group 302g. The transfer control unit 302a function as a data input section and a command decoding section. In addition, the transfer control unit 302a functions also as a part of a control section. The drive control unit 302b also functions as a part of the control section.

When serial data that includes the setting data is input to the transfer control unit 302a through the data line CDI, the transfer control unit 302a detects a start bit and decodes a command subsequent to the start bit. Thereafter, the transfer control unit 302a extracts the setting data and retains the setting data in a register (not illustrated), and performs a setting control on the drive control unit 302b.

Similarly, when serial data including the print data is input to the transfer control unit 302a through the data line SDI, the transfer control unit 302a detects a start bit, and decodes a command subsequent to the start bit. Thereafter, the transfer control unit 302a generates a print data transfer enable signal, and transfers the print data to the shift register 302c. The transfer control unit 302a temporarily stores a correlation between the decoded command and the print data in the register (not illustrated).

Figure 5:
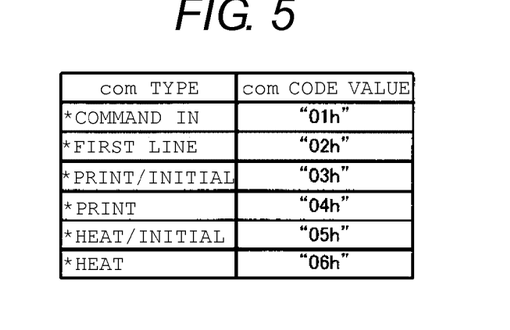
FIG. 5 illustrates an example of commands that are decoded by a transfer control unit of the driver IC.

FIG. 5 illustrates an example of the commands that are decoded by the transfer control unit 302a illustrated in FIG. 4. Here, six types of commands and six command code values are illustrated. First, "*command in ("01h")" is a setting start command included in a setting data packet (i.e., the serial data including the setting data), and represents that the setting data is included in a bit string subsequent to the command. In contrast, each of the commands other than "*command in" is a command included in a print data packet (i.e., the serial data including the print data), and represents that the print data is included in a bit string subsequent to the command by a split line (for example, by 108 pixels). Second, "*first line ("02h")" indicates that only the first line of the image data should be transferred, and that a drive output should not be performed. Third, "*printing·initial ("03h")" indicates that a drive output of a first split line out of each line of the image data should be performed. Fourth, "*printing ("04h")" indicates that a drive output of split lines other than the first split line of each line of the image data should be performed. Fifth, "*heat·initial ("05h")" indicates that a non-discharge heat drive output of the first split line of the each line of the image data should be performed. Finally, "*heat ("06h")" indicates that a non-discharge heat drive output of split lines other than the first split line of each line of the image data should be performed. According to the embodiment, when a bit string other than a combination of two bits of a start bit "01" and the above command (hereinafter, referred to as "start bit command") is input, such a bit string is determined to be a noise, and thus it is possible to greatly decrease misdetections of recognizing the noise as the combination of the start bit and the command. Each command code is represented by a bit string of eight bits, but the number of bits is not limited thereto. A longer bit string is preferable to cope with the noise, but the number of bits is preferably at least 4 bits or more in consideration of the delay of the transfer rate.

The drive control unit 302b executes a driving waveform generation or a split drive control (latch control) based on the commands corresponding to the setting data and the print data stored in the transfer control unit 302a. The driving waveform generated by the drive control unit 302b according to the embodiment includes three types of waveform: waveform A (ink discharge and ink jet head drive), waveform N (ink non-discharge and ink jet non-drive), and waveform H (ink non-discharge and heat drive).

The shift register 302c temporarily stores the print data transferred from the transfer control unit 302a. The latch circuit 302d latches and temporarily stores a resist value of the shift register 302c based on a latch control signal output from the drive control unit 302b. When one line of image data (324 pixels) is split into three groups and driving based thereon is performed, the shift register 302 and the latch circuit 302d, respectively, transfer and store the print data by 108 pixels, which is a third of the pixels of one line.

The selector 302e selects a waveform corresponding to the print data out of the drive output waveforms generated by the drive control unit 302b, based on the print data latched by the latch circuit 302d and a signal output by the drive control unit 302b, and outputs the drive signal to the level shifter 302f.

The level shifter 302f converts a voltage level of the drive signal output from the selector 302e into a level at which the analog switch group 302g may operate. The analog switch group 302g is connected to an electrode of the actuator 303. ON and OFF of the analog switch group 302g are switched based on the print data and the drive signal, and thus a potential corresponding to the drive signal is applied to the actuator 303, and printing on the sheet S or maintenance of the head is performed.

Figure 6:
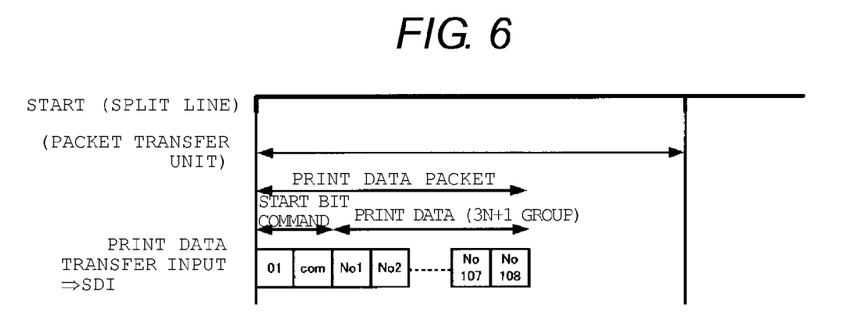
FIG. 6 illustrates a structure of print data according to the embodiment.
Figure 7:
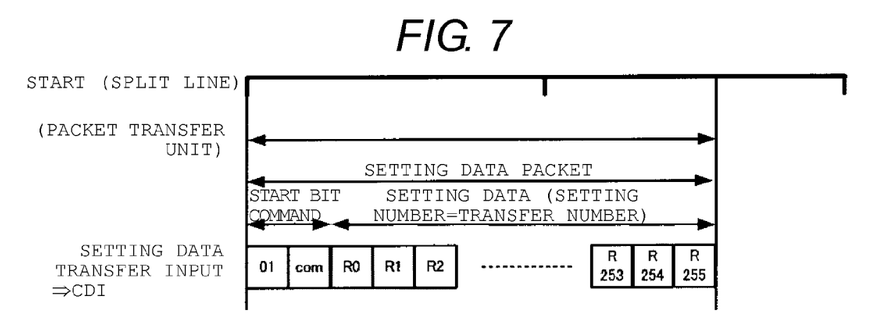
FIG. 7 illustrates a structure of setting data according to the embodiment.

FIG. 6 illustrates a structure of the print data according to the embodiment. FIG. 7 illustrates a structure of the setting data according to the embodiment. As illustrated in FIGS. 6 and 7, the print data and the setting data as the serial data are the packet data having a length equal to or less than a data transfer unit, and have a data configuration in which a command code "com" illustrated in FIG. 5 is included after the start bit "01", and the print data or the setting data is included after the command code "com". When the start bit command is detected from the packet data transferred through the data line SDI or CDI during a normal state "L", "com" is decoded by the transfer control unit 302a, and the drive control unit 302b is controlled in accordance with the command.

Figure 8:
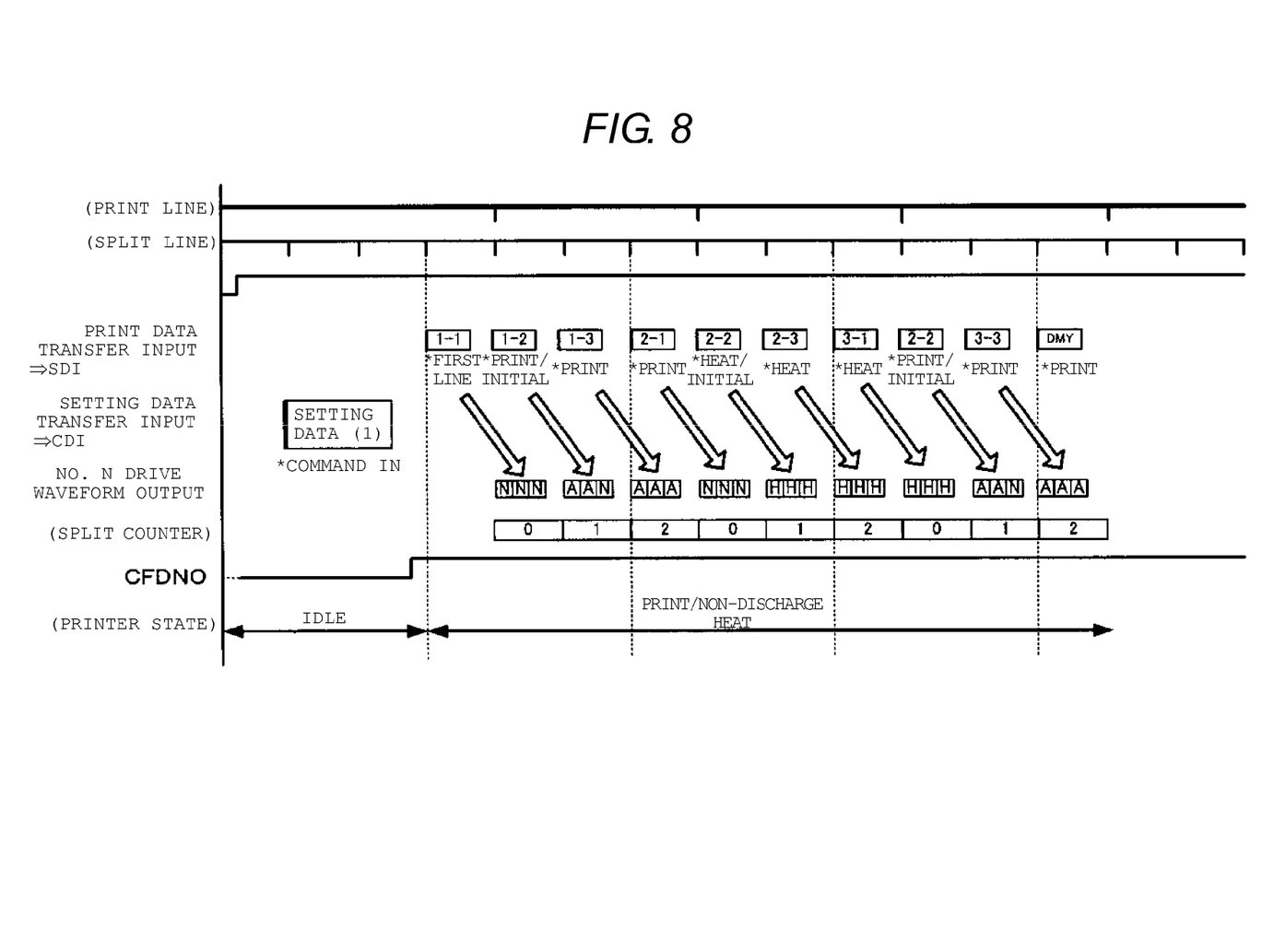
FIGS. 8 and 9 illustrate timing of inputs of the print data and the setting data and outputs of a drive waveform.
Figure 9:
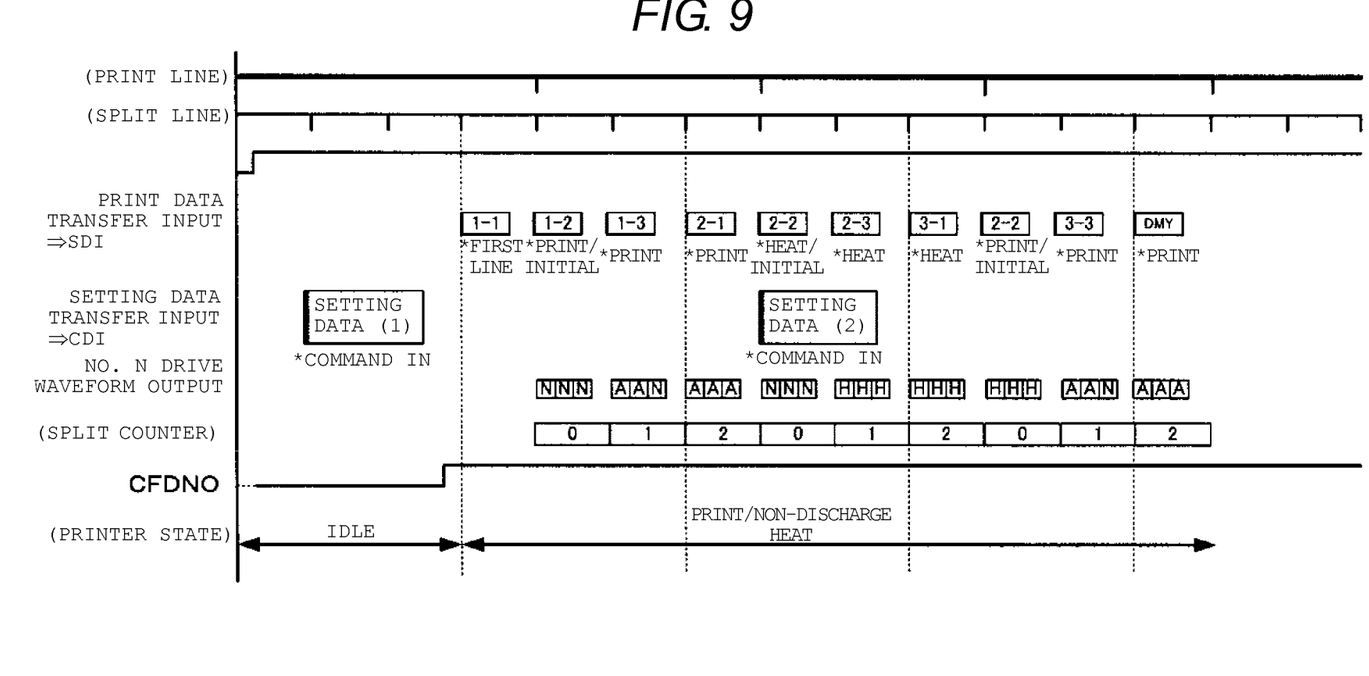

FIGS. 8 and 9 illustrate inputs of the print data and the setting data and a timing of the drive waveform output. In FIG. 8, when the printer is in an idle state, setting data (1) that includes the command ("*command in") is transferred into the driver IC 302 through the setting data line CDI from the head controller 28, and after the setting based on the setting data (1) is completed, a setting completion signal is output to the data line CFDNO. Thereafter, the split lines of the print data 1-1 to 1-3, 2-1 to 2-3, and 3-1 to 3-3 are sequentially transferred through the print data line SDI. The latch and drive output with respect to the data transfer is delayed by one split line. In FIG. 9, when the data transfer of the split line 2-2 of the print data is performed, setting data (2) that includes a command ("*command in") is transferred through the setting data line CDI from the head controller 28. In this case, since the setting for the subsequent split lines after the split line 2-3 is carried out based on the setting data (2), the voltage value applied to the actuator 303 is changed even when the output drive waveform is of the same type.

The ink jet printer 1 according to the embodiment has a plurality of control functions in accordance with a combination of a start bit and one of a plurality of commands. For example, even when the same bit string as the start bit is incidentally input in the data line due to a discharge of static electricity, a bit string other than a combination of the start bit and the command predefined as in FIG. 5 is determined as a noise. Therefore, it is possible to prevent unintended activation of the printer due to a noise. Further, since the data transfer is performed with the print data and the setting data each including a command, it is possible to change the setting of the drive waveform or the like at any timing even during the transfer of the print data by transmitting a corresponding command. For example, it is possible to perform the non-discharge heat control in which a vibration which does not cause ink to be discharged from a nozzle is applied to an ink jet chamber, without waiting for the process of the print data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ink jet head comprising:
an actuator configured to cause ejection of ink; and
a driver configured to
receive serial data including a first command, a second command subsequent thereto having a data size of four or more bits, and a bit string subsequent to the second command and having print data for printing or setting data for setting of the ink jet head,
detect the first command in the serial data,
decode the second command to determine whether the second command is a setting command, a print command, or noise,
control the actuator based on the decoded second command being the setting command or the print command, and
prevent control of the actuator based on the decoded second command being noise.

2. The ink jet head according to claim 1, wherein the first command has a data size of two bits.

3. The ink jet head according to claim 1, wherein the driver has a first input terminal and a second input terminal that is different from the first input terminal, and
the driver is further configured to receive the serial data including the print data through the first input terminal, and receive the serial data including the setting data through the second input terminal.

4. The ink jet head according to claim 3, wherein the setting data is received through the second input terminal, while the print data is received through the first input terminal.

5. The ink jet head according to claim 1, wherein
the setting command indicates that the data in the bit string is the setting data, and
the print command indicates that the data in the bit string is the print data.

6. The ink jet head according to claim 1, wherein
the driver is further configured to detect first two bits of the received serial data as the first command when a predetermined number of bits of the received serial data following the first two bits has a predetermined value or higher.

7. An ink jet printing apparatus comprising:
a head controller configured to output serial data including
a first command, a second command subsequent thereto having a size of four or more bits, and a bit string subsequent to the second command and having print data for printing or setting data for setting of the ink jet head; and
an inkjet head including
an actuator configured to cause ejection of ink, and
a driver configured to receive the serial data from the head controller, detect the first command in the serial data, decode the second command to determine whether the second command is a setting command, a print command, or noise, control the actuator based on the decoded second command being the setting command or the print command, and prevent control of the actuator based on the decoded second command being noise.

8. The ink jet printing apparatus according to claim 7, wherein the first command has a data size of two bits.

9. The ink jet printing apparatus according to claim 7, wherein
the head controller has a first output terminal and a second output terminal that is different from the first output terminal, and
the head controller is further configured to output the serial data including the print data through the first output terminal, and output the serial data including the setting data through the second output terminal.

10. The ink jet printing apparatus according to claim 9, wherein
the setting data is output through the second output terminal, while the print data is output through the first output terminal.

11. The ink jet printing apparatus according to claim 7, wherein
the setting command indicates that the data in the bit string is the setting data, and
the print command indicates that the data in the bit string is the print data.

12. The ink jet printing apparatus according to claim 7, wherein
the driver is further configured to detect first two bits of the received serial data as the first command when a predetermined number of bits of the received serial data following the first two bits has a predetermined value or higher.

13. A method for operating an ink jet head having an actuator configured to cause ejection of ink comprising:
receiving serial data including a first command, a second command subsequent thereto having a size of four or more bits, and a bit string subsequent to the second command and having print data for printing or setting data for setting of the ink jet head,
detecting the first command in the serial data;

decoding the second command to determine whether the second command is a setting command, a print command, or noise;

controlling the actuator based on the decoded second command being the setting command or the print command; and preventing control of the actuator based on the decoded second command being noise.

14. The method according to claim 13, wherein the first command has a data size of two bits.

15. The method according to claim 13, wherein the receiving of the serial data including the print data is carried out through a first input terminal, and the receiving of the serial data including the setting data is carried out through a second input terminal that is different from the first input terminal.

16. The method according to claim 15, wherein the setting data is received through the second input terminal, while the print data is received through the first input terminal.

17. The method according to claim 13, wherein the setting command indicates that the data in the bit string is the setting data, and the print command indicates that the data in the bit string is the print data.

* * * * *